(12) United States Patent
Track et al.

(10) Patent No.: US 12,429,098 B2
(45) Date of Patent: Sep. 30, 2025

(54) DUAL PROPULSION SYSTEM WITH DRIVE UNIT CLUTCH ACTUATOR

(71) Applicant: Stoneridge, Inc., Novi, MI (US)

(72) Inventors: Alexander John Track, Woodhaven, MI (US); Hongliang Chen, Rochester Hills, MI (US)

(73) Assignee: Stoneridge Control Devices, Inc., Novi, MI (US)

( * ) Notice: Subject to any disclaimer, the term of this patent is extended or adjusted under 35 U.S.C. 154(b) by 421 days.

(21) Appl. No.: 17/975,173

(22) Filed: Oct. 27, 2022

(65) Prior Publication Data

US 2023/0175556 A1 Jun. 8, 2023

Related U.S. Application Data

(60) Provisional application No. 63/285,649, filed on Dec. 3, 2021.

(51) Int. Cl.

| | | |
|---|---|---|
| *F16H 63/34* | (2006.01) | |
| *B60K 6/387* | (2007.10) | |
| *B60K 6/48* | (2007.10) | |
| *B60K 6/52* | (2007.10) | |
| *B60K 17/344* | (2006.01) | |

(Continued)

(52) U.S. Cl.
CPC .............. *F16D 11/12* (2013.01); *B60K 6/387* (2013.01); *B60K 6/48* (2013.01); *B60K 6/52* (2013.01); *B60K 17/344* (2013.01); *B60K 23/08* (2013.01); *F16D 28/00* (2013.01); *B60K 17/356* (2013.01); *B60Y 2200/92* (2013.01); *F16D 2011/006* (2013.01)

(58) Field of Classification Search
CPC ........................... B60K 6/387; F16H 63/3433
See application file for complete search history.

(56) References Cited

U.S. PATENT DOCUMENTS

| | | |
|---|---|---|
| 4,185,725 A | 1/1980 | Maina |
| 4,721,194 A | 1/1988 | Frost |
| | (Continued) | |

FOREIGN PATENT DOCUMENTS

| | | | |
|---|---|---|---|
| CN | 111720537 A | * 9/2020 | |
| DE | 102009030027 A1 | * 12/2010 | ............. B60K 17/02 |

OTHER PUBLICATIONS

International Preliminary Report on Patentability for International Application No. PCT/US2022/048053 mailed Jun. 13, 2024.

(Continued)

*Primary Examiner* — Stacey A Fluhart
(74) *Attorney, Agent, or Firm* — Carlson, Gaskey & Olds, P.C.

(57) ABSTRACT

A clutch actuator assembly includes a motor that is arranged in an actuator housing, a gear train that couples the motor and an output shaft, an actuator lever that is affixed to the output shaft and includes a profile that has first and second features that respectively correspond to first and second positions, a detent that cooperates with the profile and is configured to retain the actuator lever in one of the first and second positions, and a pawl that is operatively connected to the actuator lever and is configured to selectively engage with a clutch component in response to movement of the actuator lever between the first and second positions.

12 Claims, 3 Drawing Sheets

(51) Int. Cl.
*B60K 23/08* (2006.01)
*F16D 11/12* (2006.01)
*F16D 28/00* (2006.01)
B60K 17/356 (2006.01)
F16D 11/00 (2006.01)

(56) References Cited

U.S. PATENT DOCUMENTS

| | | |
|---|---|---|
| 5,967,939 A | 10/1999 | Reik et al. |
| 9,574,619 B1 | 2/2017 | Littlefield |
| 2008/0302628 A1* | 12/2008 | Kimura ............... F16H 63/3458 192/220 |
| 2009/0064774 A1 | 3/2009 | Panzer et al. |
| 2013/0325231 A1 | 12/2013 | Park |
| 2018/0112774 A1* | 4/2018 | Littlefield ........... F16H 63/3466 |
| 2019/0211928 A1* | 7/2019 | Puiu ..................... F16D 63/006 |
| 2020/0200270 A1* | 6/2020 | Lenke ................. F16H 63/3466 |
| 2020/0232275 A1 | 7/2020 | Dann et al. |

OTHER PUBLICATIONS

International Search Report and Written Opinion for International Application No. PCT/US2022/048053 mailed Feb. 10, 2023.

\* cited by examiner

DUAL PROPULSION SYSTEM WITH DRIVE UNIT CLUTCH ACTUATOR

CROSS-REFERENCE TO RELATED APPLICATION

This application claims priority to U.S. Provisional Application No. 63/285,649 filed Dec. 3, 2021.

BACKGROUND

The disclosure relates to drive unit clutch actuator used, for example, in a vehicle dual propulsion system.

Actuators are used in vehicle drive trains for various purposes. One actuator application is for shifting between transmission gears. Another type of actuator is used as a park-lock for a drive train component. Each actuator application has its own unique challenges.

SUMMARY

In one exemplary embodiment, a clutch actuator assembly includes a motor that is arranged in an actuator housing, a gear train that couples the motor and an output shaft, an actuator lever that is affixed to the output shaft and includes a profile that has first and second features that respectively correspond to first and second positions, a detent that cooperates with the profile and is configured to retain the actuator lever in one of the first and second positions, and a pawl that is operatively connected to the actuator lever and is configured to selectively engage with a clutch component in response to movement of the actuator lever between the first and second positions.

In a further embodiment of any of the above, the assembly includes a detent spring that biases the detent into engagement with the profile. The profile includes a peak that is provided between first and second features.

In a further embodiment of any of the above, the assembly includes a rod that is pivotally attached to the actuator lever and extends to a block. The block engages the pawl. The rod is in an extended position and the pawl is in an engaged position with the clutch component in the first position. The rod is in a retracted position and the pawl is in a disengaged position from the clutch component in the second position.

In a further embodiment of any of the above, the block has rollers that engage a ramp and the pawl while the rod is extended and retracted.

In a further embodiment of any of the above, the assembly includes an actuator spring that cooperates with the block and is configured to permit the rod to compress when the rod moves from the retracted position to the extended position in response to a force from the pawl.

In a further embodiment of any of the above, the assembly includes a pawl return spring that is configured to bias the pawl from the engaged position toward the disengaged position.

In a further embodiment of any of the above, the assembly includes a clutch component housing that has first and second sides opposing one another. The actuator housing is secured the first side, and the actuator lever is arranged on the second side.

In a further embodiment of any of the above, the assembly includes a bracket that is configured to support the detent and the ramp. The bracket is secured to the clutch component housing.

In a further embodiment of any of the above, the clutch component is a clutch gear with notches. The pawl is configured to selectively seat within the notches.

In a further embodiment of any of the above, the gear train includes first and second gear reduction sets that are coupled to one another and interconnect the motor to a sector gear.

In a further embodiment of any of the above, the actuator housing includes first and second housing portions. A plate is arranged in the actuator housing and supports the first and second gear reduction sets and the motor.

In another exemplary embodiment, a vehicle drive train includes the clutch actuator assembly further including first and second propulsion sources that are selectively interconnected to one another by the clutch component in the engaged and disengaged positions.

In a further embodiment of any of the above, the vehicle drive train includes a configured to command the clutch actuator assembly between the engaged and disengaged positions. A printed circuit board is in communication with a controller. The printed circuit board is arranged in the actuator housing and is in communication with a sensor that monitors a position indicator that is coupled to the gear train indicative of the engaged and disengaged positions.

In another exemplary embodiment, a method of operating a clutch assembly includes energizing an electric motor, driving an output shaft via a gear train, rotating an actuator lever with the output shaft, moving a pawl in response with the actuator lever, and selectively engaging or disengaging a clutch gear with the pawl.

In a further embodiment of any of the above, the method includes a step of sending a command to an actuator printed circuit board. The electric motor energizing step is performed in response to the command.

In a further embodiment of any of the above, the method includes a step of coupling or uncoupling first and second propulsion sources to one another in response to performing the selectively engaging or disengaging step.

In a further embodiment of any of the above, the clutch assembly includes a position sensor, and includes the step of verifying a commanded position with the position sensor.

In a further embodiment of any of the above, the coupling or uncoupling step is performed with at least one of the first and second propulsion sources already propelling a vehicle.

In a further embodiment of any of the above, the method includes a step of retaining the actuator lever in a position with a detent.

In a further embodiment of any of the above, one of the first and second propulsion sources is an internal combustion engine, and the other of the first and second propulsion sources is an electric motor-driven drive unit.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

The disclosed drive unit clutch actuator (DUCA) is a component of an electric drive unit and it connects to and rotates a manual shaft to and from two discrete positions for a specified angular travel and speed at various loading conditions. In the disclosed example, the DUCA is a modular design made of a controller (e.g., PCB), an electric motor, a two-stage gear reduction transmission, and an output shaft position sensor. The DUCA is part of a clutch disconnect system that interfaces with the transmission shaft and mounts external to the transmission housing or drive unit. A function of the DUCA is to respond to a command received over vehicle communications network from a drive train controller, perform its clutch function, and provide feedback on its current status to the drive train controller.

Figure 1:
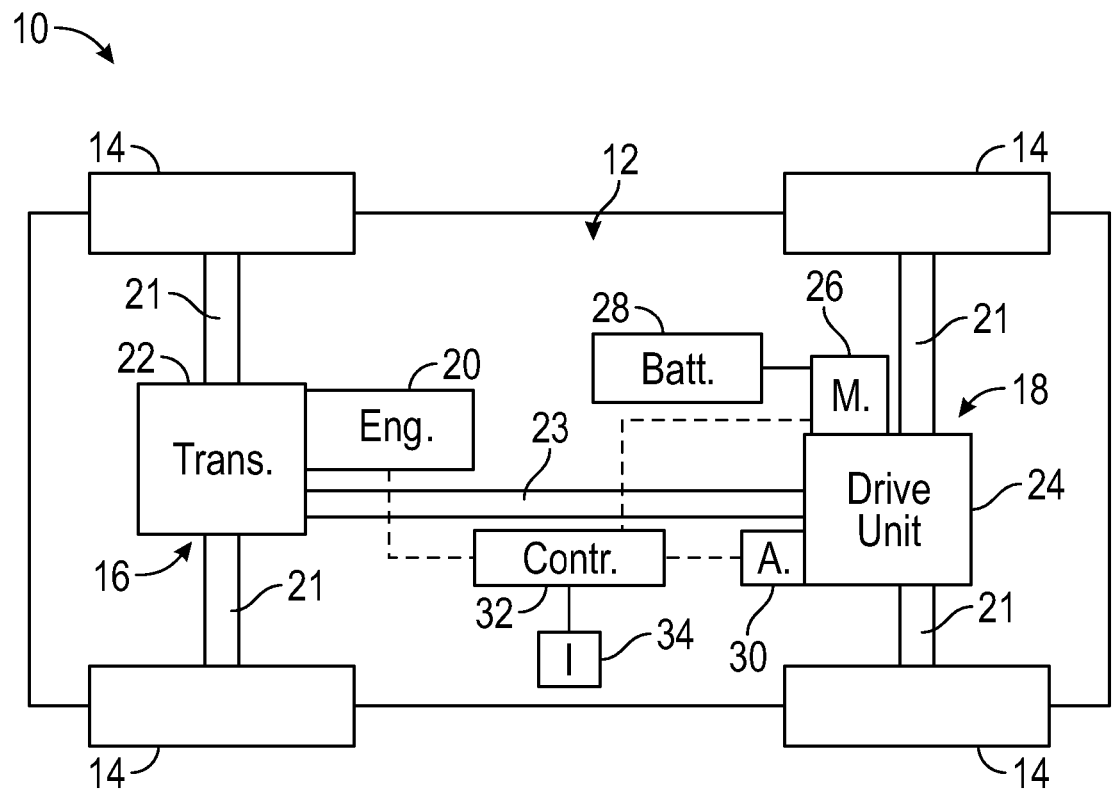
FIG. 1 is a schematic view of a vehicle with a dual propulsion system having the disclosed clutch and actuator.

An example vehicle 10 is schematically shown in FIG. 1. The vehicle 10 includes a drive train 12 configured to rotationally drive wheels 14 in response to a first propulsion source 16 and/or a second propulsion source 18, providing a hybrid powertrain, for example. In one example, the first propulsion source 16 is an internal combustion engine 20 that may be used to drive one set of wheels 14 via a transmission and drive axles 21. The second propulsion source 18 has an electric drive motor 26 coupled to a drive unit 24 or transmission for powering another set of wheels 14 via drive axles 21. The electric drive motor 26 is powered by a battery 28, which may be 48 volts, for example.

A driveshaft 23 interconnects the first and second propulsion sources 16, 18 so that different wheels may be powered by different power sources, and/or so that both power sources may be used simultaneously in a coordinated manner. A clutch actuator 30, which in the disclosed application is referred to as a drive unit clutch actuator (DUCA), is used to shift a clutch in the drive unit 24 in response to a command from a controller 32, for example, over a CAN or LIN bus, that is triggered by at least one input 34, such as throttle position or a driver-selected performance mode.

Figure 2:
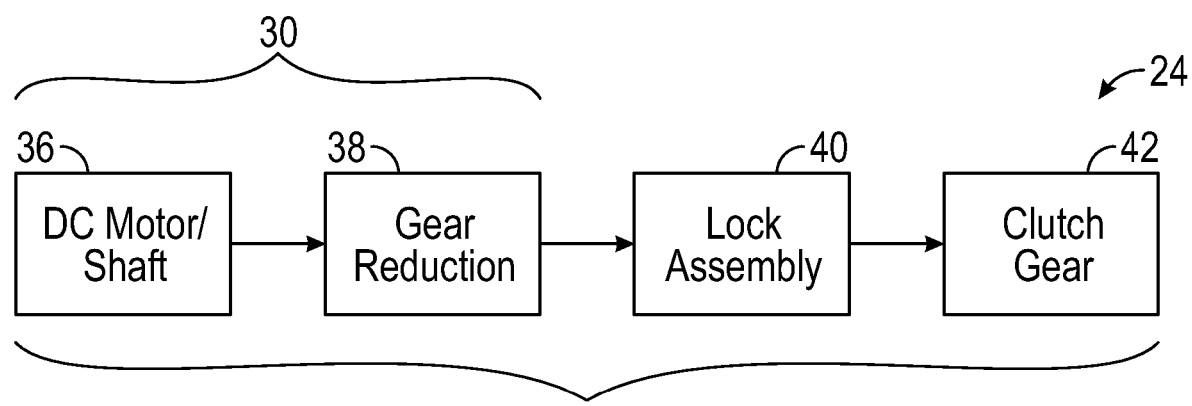
FIG. 2 is a schematic view of a drive train actuation system for the vehicle of FIG. 1.
Figure 3A:
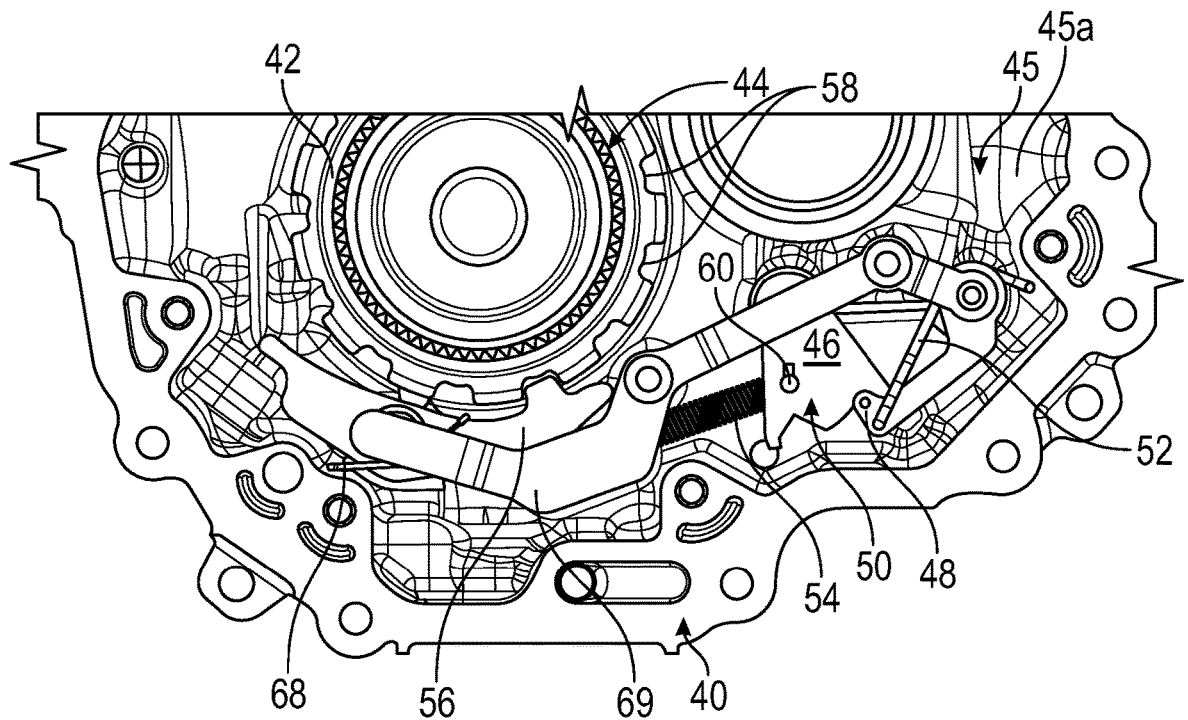
FIG. 3A depicts a lock assembly for a drive unit clutch.

Referring to FIGS. 2 and 3A, a clutch assembly 44 is provided by the clutch actuator 30 that includes a DC motor 36 that operates through a gear reduction gear train 38 to manipulate a lock assembly 40, which selectively engages and disengages with respect to a clutch gear 42 in the drive unit 24. One example clutch actuator 30 and lock assembly 40 is shown in FIGS. 3A-4.

Figure 3B:
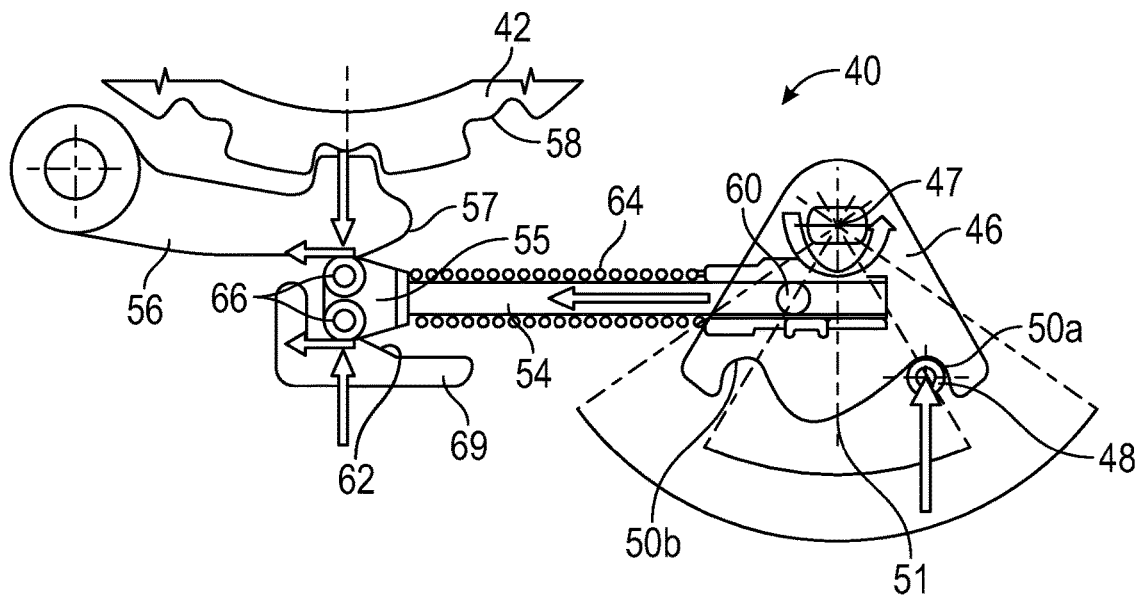
FIG. 3B illustrates a portion of the lock assembly shown in FIG. 3A.
Figure 4:
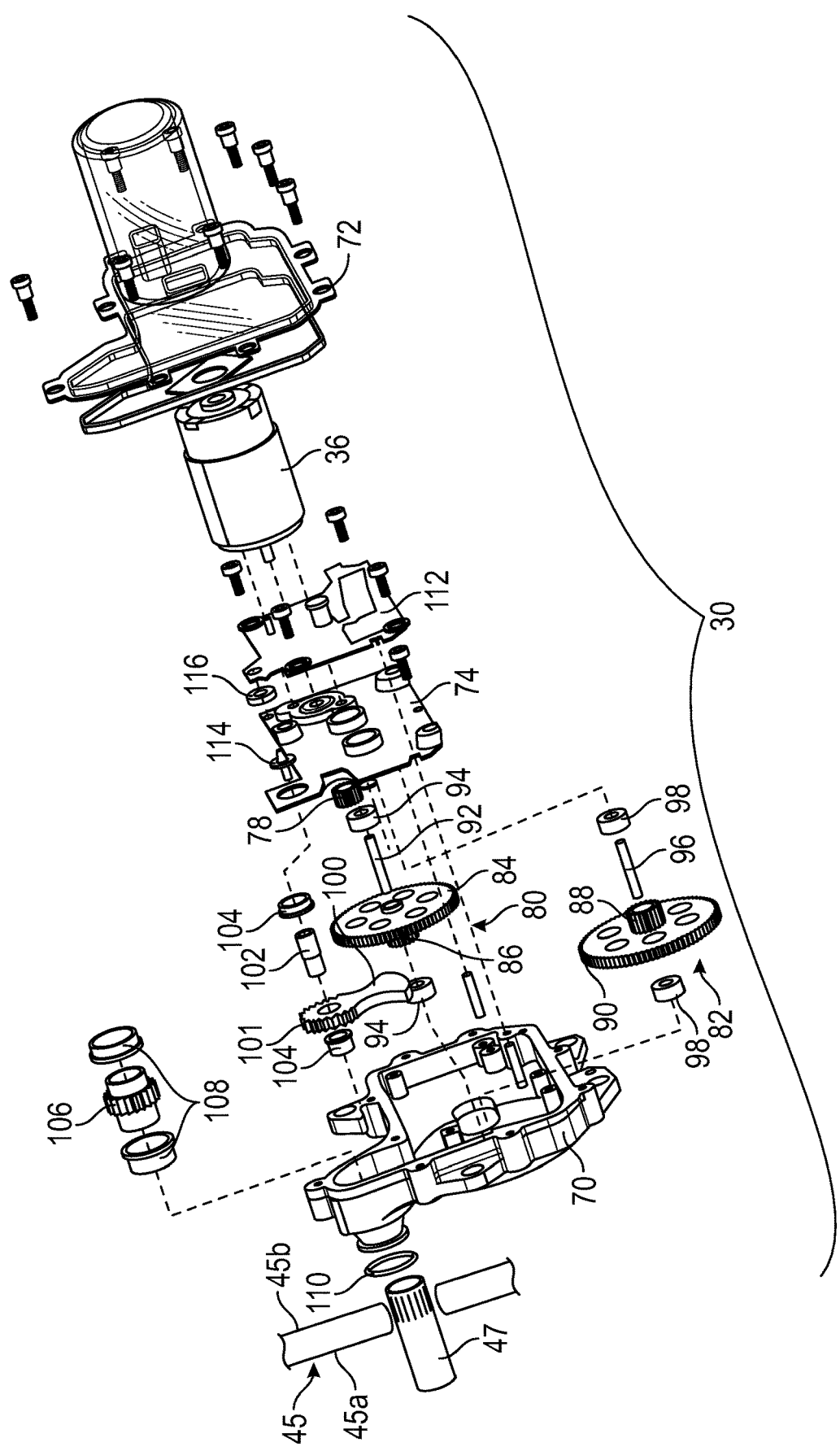
FIG. 4 is an exploded view of the actuator.

With reference to FIGS. 3A and 3B, the lock assembly 40 is secured to a first side 45a of a housing 45 of the drive unit 24. The first side 45a may be a "wet" side exposed to a transmission shifting lubricant. The lock assembly 40 selectively engages a clutch component provided by a clutch gear 42 in the example.

The lock assembly 40 includes an actuator lever 46 affixed to an output shaft 47 of the clutch actuator 30. The actuator lever 46 has a profile 50 having first and second features 50a, 50b (e.g., valleys or recesses) respectively corresponding to first and second positions. The clutch gear 42 is engaged in with the actuator lever 46 in the first position (shown in FIG. 3B) and disengaged with the actuator lever 46 in the second position (actuator lever 46 rotated counterclockwise to position depicted in FIG. 3B).

The profile 50 includes a peak 51 provided between the first and second features 50b, 50b. A detent 48 cooperates with the profile 50 and is configured to retain the actuator lever 46 in one of the first and second positions. A detent spring 52, e.g., a torsion spring, biases the detent 48 into engagement with the profile 50.

A bracket 69 is used to support at least several lock assembly components on the first side 45a of the housing 45, which can simplify and speed installation. In the disclosed example, the detent 48 detent spring 52 is carried by the bracket 69.

The clutch gear 42 includes notches 58 spaced about its periphery, and a claw on a pawl 56 pivotally supported by the housing 45 is configured to selectively seat within the notches 58 when in an engaged position. The pawl 56 is operatively connected to the actuator lever 46 via a rod 54 in the example lock assembly 40. The pawl 56 is configured to selectively engage with the clutch gear 42 in response to movement of the actuator lever 46 between the first and second positions. In the example, the first and second propulsion sources 16, 18 are selectively interconnected to one another by the clutch gear 42 in the engaged and disengaged positions.

A pawl return spring 68, e.g., a coil spring, biases the pawl 56 to a disengaged position with respect to the clutch gear 42 (shown engaged in FIG. 3B). The pawl return spring 68, e.g. a torsion spring, is retained in position with respect to the pawl 56 by the bracket 69.

The rod 54 is pivotally attached to the actuator lever 46 by a pin 60 at one end and extends to a block 55 at the opposing end. The block 55 include rollers 66 that engage the pawl 56 and a ramp 62 carried by the bracket 69. When the rod 54 is in an extended position, the pawl 56 is in an engaged position with the actuator lever 46 in the first position. When the rod 54 is in a retracted position, the pawl 56 is a disengaged position with the actuator lever 46 in the second position. From the retracted position, the rollers 66 move up the ramp 62 and along a ramped surface 57 of the pawl 56, which overcomes the pawl return spring 68 for forces the pawl 56 from the disengaged position toward the clutch gear 42.

Occasionally during operation, the claw on the pawl 56 may not yet be fully aligned with a notch 58 during a clutch shifting sequence. So, the clutch gear 42 may kick the rod 54 toward the actuator lever 46 until the claw is aligned with and seated in a notch 58. An actuator spring 64 cooperates with the block 55 and is configured to absorb the kickback by compressing to insulate the actuator lever 46 and clutch actuator 30 from the force of the pawl 56 as the rod 54 attempts to move from the retracted to the extended position.

The clutch actuator 30 is secured to the second side 45b, as shown in FIG. 4. The output shaft 47 extends from the clutch actuator 30 on the second side 45b through a hole in the housing 45 to the first side 45a.

The gear train 38 couples the motor 36 and the output shaft 47. The motor 36 is mounted to a plate 74 arranged between first and second housing portions 70, 72 of the clutch actuator 30. A seal 110 is provided between the first housing portion 70 and the housing 45 to prevent lubrication leakage from the drive unit 24.

In the example, the gear train 38 includes first and second gear reduction sets 80, 82 coupled to one another and interconnecting the motor 36 to a sector gear 100 that drives the output shaft 47 via opposing gear 101 and output gear 106. The first and second gear reduction sets 80, 82 are respectively supported by first and second shafts 92, 96 respectively supported by first and second bearings 94, 98.

The bearings 94, 98 are mounted to the plate 74 and the first housing portion 70. The pinion 78 is coupled directly to a first drive gear 84 that rotates coaxial first driven gear 86. The first driven gear 86 is coupled directly to second drive gear 88 that rotates second driven gear 90. The second driven gear 86 is coupled directly to the sector gear 100, which rotates the opposing gear 101 about its axis relative to its supporting shaft 102 and bushings 104.

The opposing gear 101 directly engages the output gear 106, which is supported by bushings 108. The output shaft 47 is affixed to the output gear 106 with splines.

The clutch actuator 30 includes a printed circuit board (PCB) 112 in communication with the controller 32 (FIG. 1). The controller 32 is configured to command the clutch actuator 30 between the engaged and disengaged positions. The PCB 112 monitors the operation of the clutch actuator 30 to ensure the commanded position is achieved. A sensor 116, which may be supported by the PCB 112, that monitors a position indicator 114 coupled to the gear train 38, for example, mounted to and for rotation with the opposing gear 101. The position of the opposing gear 101 correlates with the position of the actuator lever 46 so that the PCB 112 can determine whether the engaged and disengaged positions have been achieved. Failing to achieve the commanded position will trigger a fault in the PCB 112 that is sent to the controller 32.

In operation, one method of operating the disclosed clutch assembly includes energizing the electric motor 36, which drives the output shaft 47 via the gear train 38. As a result, the output shaft 47 rotates the actuator lever 46, thus moving the pawl 56 via the rod 54 to selectively engaging or disengaging the clutch gear 42 with the pawl 56. The actuator lever 46 is maintained in its commanded position by the detent 48.

Energizing the motor 36 is first initiated by a command from either the controller 32 or the PCB 112. The command is used to couple or uncouple the first and second propulsion sources 16, 18 to one another when operating the vehicle's drive train 12 in a manner in which the vehicle already being propelled (i.e., the clutch actuator 30 functioning other than a park-lock). To ensure desired operation of the clutch actuator 30, the position sensor 116 verifies the commanded position is ultimately achieved.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A clutch actuator assembly comprising:
   a motor arranged in an actuator housing, wherein the actuator housing includes first and second housing portions, and a plate is arranged in the actuator housing;
   a gear train coupling the motor and an output shaft, wherein the gear train includes first and second gear reduction sets coupled to one another and interconnecting the motor to a sector gear, wherein the plate supports the first and second gear reduction sets and the motor;
   an actuator lever affixed to the output shaft and including a profile having first and second features respectively corresponding to first and second positions;
   a detent cooperating with the profile and configured to retain the actuator lever in one of the first and second positions; and
   a pawl operatively connected to the actuator lever and configured to selectively engage with a clutch component in response to movement of the actuator lever between the first and second positions.

2. The assembly of claim 1, comprising a detent spring biasing the detent into engagement with the profile, wherein the profile includes a peak provided between first and second features.

3. The assembly of claim 1, comprising a rod pivotally attached to the actuator lever and extending to a block, the block engaging the pawl, wherein the rod is in an extended position and the pawl is in an engaged position with the clutch component in the first position, and the rod is in a retracted position and the pawl is a disengaged position from the clutch component in the second position.

4. The assembly of claim 3, wherein the block has rollers engaging a ramp and the pawl while the rod is extended and retracted.

5. The assembly of claim 3, comprising an actuator spring cooperating with the block and configured to permit the rod to compress when the rod moves from the retracted position to the extended position in response to a force from the pawl.

6. The assembly of claim 5, comprising a pawl return spring configured to bias the pawl from the engaged position toward the disengaged position.

7. The assembly of claim 1, wherein the clutch component is a clutch gear with notches, and the pawl is configured to selectively seat within the notches.

8. A vehicle drive train comprising:
   a motor arranged in an actuator housing;
   a gear train coupling the motor and an output shaft, wherein the gear train includes first and second gear reduction sets coupled to one another and interconnecting the motor to a sector gear;
   an actuator lever affixed to the output shaft and including a profile having first and second features respectively corresponding to first and second positions;
   a detent cooperating with the profile and configured to retain the actuator lever in one of the first and second positions;
   a pawl operatively connected to the actuator lever and configured to selectively engage with a clutch component in response to movement of the actuator lever between the first and second positions;
   a rod pivotally attached to the actuator lever and extending to a block, the block engaging the pawl, wherein the rod is in an extended position and the pawl is in an engaged position with the clutch component in the first position, and the rod is in a retracted position and the pawl is a disengaged position from the clutch component in the second position;
   first and second propulsion sources selectively interconnected to one another by the clutch component in the engaged and disengaged positions; and a controller configured to command the clutch component between the engaged and disengaged positions, and a printed circuit board in communication with a controller, the printed circuit board arranged in the actuator housing and in communication with a sensor that monitors a position indicator coupled to the gear train indicative of the engaged and disengaged positions.

9. A method of operating a clutch assembly, comprising:

energizing an electric motor in an actuator housing;

sending a command to a printed circuit board arranged in the actuator housing, wherein the electric motor energizing step is performed in response to the command;

driving an output shaft via a gear train arranged in the actuator housing;

rotating an actuator lever with the output shaft;

moving a pawl in response with the actuator lever;

selectively engaging or disengaging a clutch gear with the pawl;

retaining the actuator lever in a position with a detent; and coupling or uncoupling first and second propulsion sources to one another in response to performing the selectively engaging or disengaging step.

10. The method of claim 9, wherein the clutch assembly includes a position sensor, and comprising the step of verifying a commanded position with the position sensor.

11. The method of claim 9, wherein the coupling or uncoupling step is performed with at least one of the first and second propulsion sources already propelling a vehicle.

12. The method of claim 9, wherein one of the first and second propulsion sources is an internal combustion engine, and the other of the first and second propulsion sources is an electric motor-driven drive unit.

* * * * *